United States Patent [19]

Iwata et al.

[11] 4,393,280
[45] Jul. 12, 1983

[54] ELECTRICAL SWITCHING ARRANGEMENT

[75] Inventors: Masayosi Iwata, Hashima; Harumi Douke, Komaki, both of Japan

[73] Assignee: Kabushiki Kaisha Tokai Rika Denki Seisakusho, Aichi, Japan

[21] Appl. No.: 202,196

[22] Filed: Oct. 30, 1980

[30] Foreign Application Priority Data

Nov. 7, 1979 [JP] Japan .................... 54-155141[U]

[51] Int. Cl.³ ............................................. H01H 9/00
[52] U.S. Cl. ................................ 200/4; 200/61.27; 200/61.54
[58] Field of Search ................ 200/4, 61.27, 61.3, 200/61.34, 61.35, 61.54

[56] References Cited

U.S. PATENT DOCUMENTS

| | | | |
|---|---|---|---|
| 4,149,048 | 4/1979 | Winter et al. | 200/61.27 X |
| 4,218,595 | 8/1980 | Honjo | 200/61.54 |
| 4,219,706 | 8/1980 | Koch et al. | 200/4 |
| 4,238,650 | 12/1980 | Cryes et al. | 200/4 |
| 4,293,743 | 10/1981 | Iwata et al. | 200/4 |

*Primary Examiner*—J. R. Scott
*Attorney, Agent, or Firm*—Wenderoth, Lind & Ponack

[57] ABSTRACT

An electrical switching arrangement for use in a motor vehicle and the like includes a support frame, a control lever rotatably provided on the support frame for pivotal movement about a first support axis, and about a second support axis directed in a direction different from that of the first support axis together with a first actuating member, and also for rotation about its own axis together with a second actuating member. A switch unit is detachably mounted on the support frame and has a switch base in which a plurality of switch elements associated with the first and second actuating members are provided so as to be selectively opened and closed through the first and second actuating members upon rotation of the control lever about the second axis and about its own axis.

8 Claims, 22 Drawing Figures

Fig. 10
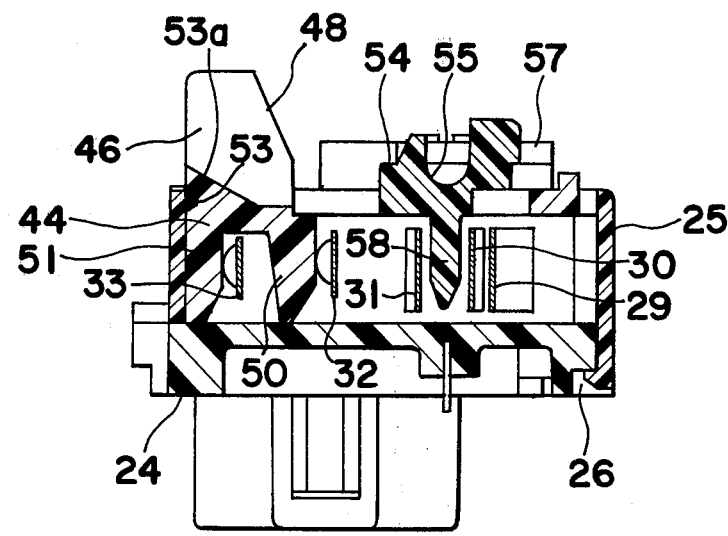
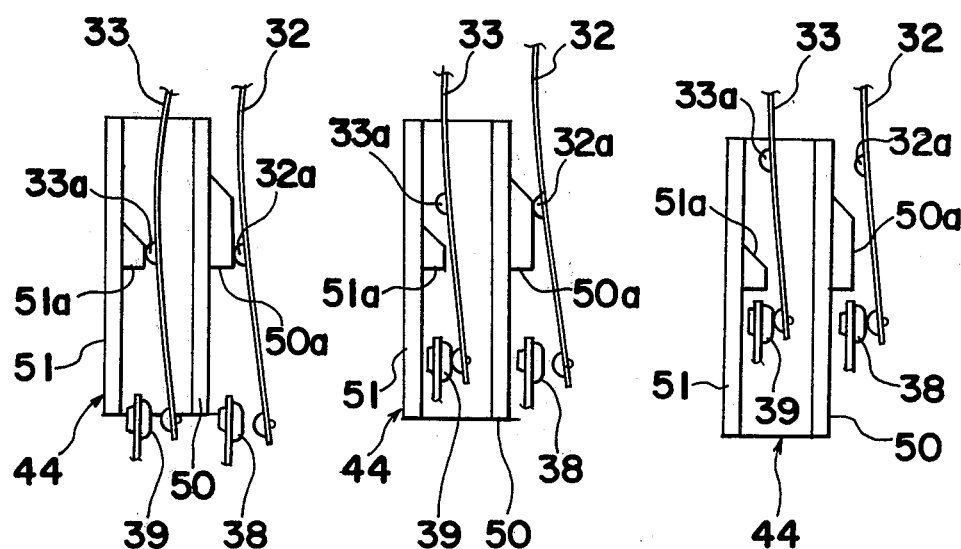
Fig. 11(a)   Fig. 11(b)   Fig. 11(c)

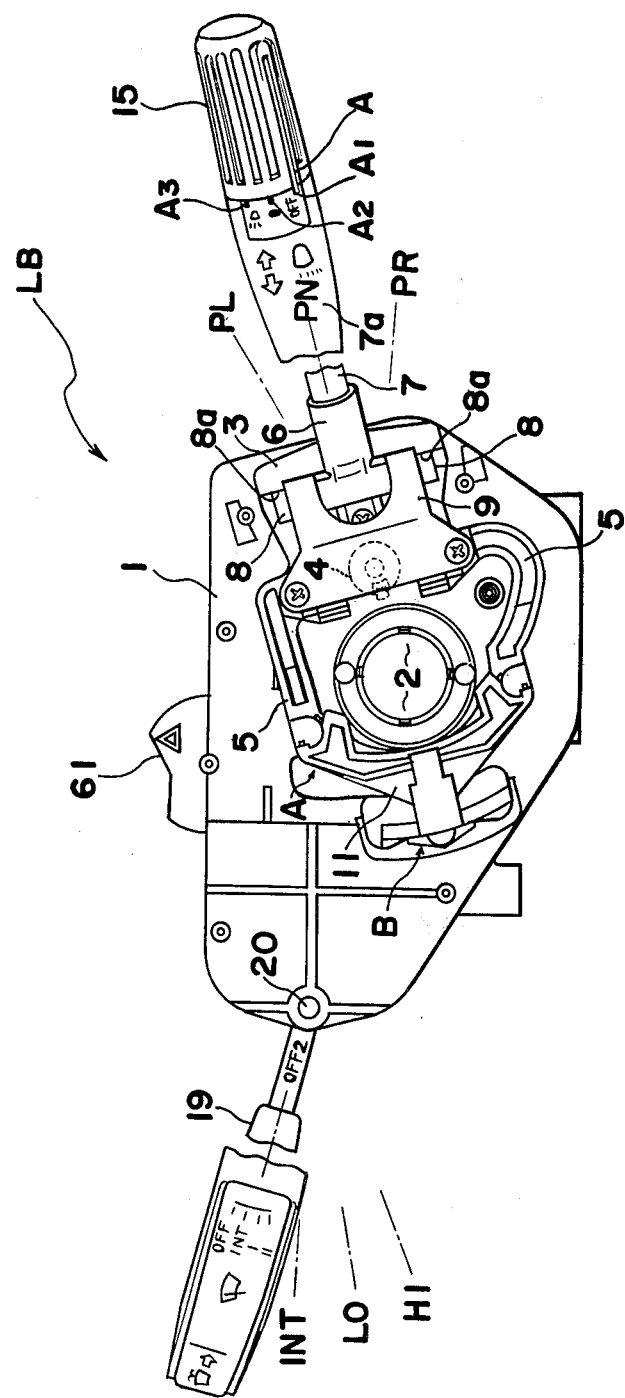

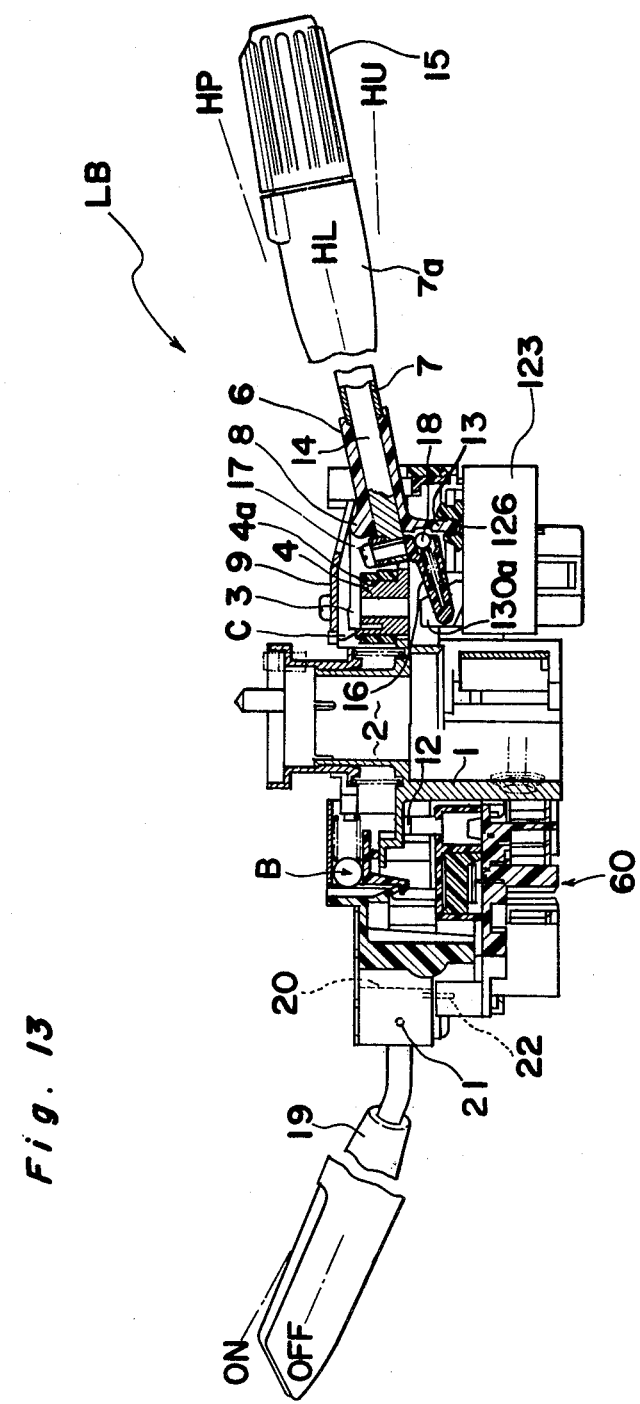

ELECTRICAL SWITCHING ARRANGEMENT

BACKGROUND OF THE INVENTION

The present invention generally relates to an electrical switching arrangement suitable for controlling a plurality of loads in association with each other, and more particularly, to an electrical switching arrangement, for example, for use in motor vehicles in which sliding members are provided so as to selectively open or close electrical connections between stationary contacts and contact plates or contact springs through displacement of the contact springs by the sliding members.

Generally, the loads as referred to above include, for example, small lamps (side lamps, instrument illuminating lamps, etc.), high beam head lamps, low beam head lamps, etc. of motor vehicles, and for control thereof through mutual association therebetween under predetermined conditions, there are provided a light switch and a dimmer and passing switch. Since the switches as described above are to be controlled by operating members each having a particular purpose inherent therein, they have conventionally been constituted independently so as to be associated with each other through wiring means, and thus, the switching arrangement on the whole tends to be large in size and to occupy a considerable space, with further complication of electrical circuit constructions.

Meanwhile, in the conventional switching arrangements in which the switch is adapted to be turned OFF by displacing the contact plate or contact spring through depression thereof at one position of the sliding member, and to be turned ON by releasing the depression of the contact spring at the other position of the sliding member, since no spring force is applied by the contact spring to the sliding member at the ON position of the switch, the sliding member undesirably becomes unstable or unsteady in an opening in which it is accommodated, due to vibration, etc. of the motor vehicle. On the other hand, in the case where it is necessary to adopt a system in which the sliding member is coupled with an actuating member for subjecting the sliding member to sliding movement through an engaging mechanism, it is not possible to prevent the unsteady state of the sliding member by the actuating member, if the engaging mechanism employed is of movable or loose fit with respect to the sliding member for alleviation of dimensional inaccuracy or for facilitation of assembly of the engaging mechanism.

SUMMARY OF THE INVENTION

Accordingly, an essential object of the present invention is to provide an electrical switching arrangement capable of electrically controlling a plurality of loads in association with each other through combinations of operations of a plurality of operating members each having functions inherent therein, in which the control is achieved by common switch elements with consequent compact size of the entire switching arrangement through simple construction.

Another important object of the present invention is to provide an electrical switching arrangement of the above described type in which, even when a construction employed can not sufficiently prevent a sliding member from being unstable with respect to the actuating member for sliding the sliding member, the unsteady state of the sliding member due to the vibration and the like of the motor vehicle is positively eliminated while the sliding member is located where it is not subjected to depression by contact springs.

A further object of the present invention is to provide an electrical switching arrangement of the above described type which is accurate in function with high reliability, and can be readily manufactured on a large scale at low cost.

In accomplishing these and other objects, according to one preferred embodiment of the present invention, there is provided an improved electrical switching arrangement for use in a motor vehicle and the like which includes a support frame, a control lever member rotatably provided on the support frame for pivotal movement about a first support axis, and about a second support axis directed in a direction different from that of the first support axis together with a first actuating member, and also for rotation about its own axis together with a second actuating member, and a switch unit detachably mounted on the support frame and having a switch base in which a plurality of switch elements associated with the first and second actuating members are provided so as to be selectively opened and closed by the first and second actuating members upon rotation of the control lever member about the second axis and about its own axis. The switch unit further includes a plurality of cam actuators movably provided in the switch base for selective opening and closing of the switch elements, a second sliding member movably provided on the switch base and associated with the first actuating member for reciprocation in predetermined directions upon rotation of the control lever member about the second axis, a first sliding member movably provided in said second sliding member and associated with said second actuating member for reciprocation in directions intersecting said predetermined reciprocating directions of said second sliding member upon rotation of the control lever member about its own axis, cam portions provided in the first sliding member for selectively displacing the cam actuators so as to open and close the corresponding ones of the switch elements through the reciprocation of the first sliding member.

By the arrangement according to the present invention as described above, an improved switching arrangement compact in size and efficient in operation at high reliability has been advantageously provided through simple construction, without the possibility of instability of the sliding member, and with substantial elimination of disadvantages inherent in the conventional switching arrangements of this kind.

BRIEF DESCRIPTION OF THE DRAWINGS

These and other objects and features of the present invention will become apparent from the following description taken in conjunction with the preferred embodiments thereof with reference to the accompanying drawings, in which;

FIG. 10 is a cross section taken along the line X—X in FIG. 7, FIGS. 11(a) to 11(c) are fragmentary diagrams of switching portions employed in the switch unit of FIGS. 4 and 5 explanatory of the functioning of the switch elements, FIG. 12 is a view similar to FIG. 1, which particularly shows a modification thereof, FIG. 13 is a side sectional view of the modified electrical switching arrangement of FIG. 12.

Before the description of the present invention proceeds, it is to be noted that like parts are designated by like reference numerals throughout the several views of the accompanying drawings.

DETAILED DESCRIPTION OF THE INVENTION

Figure 1:
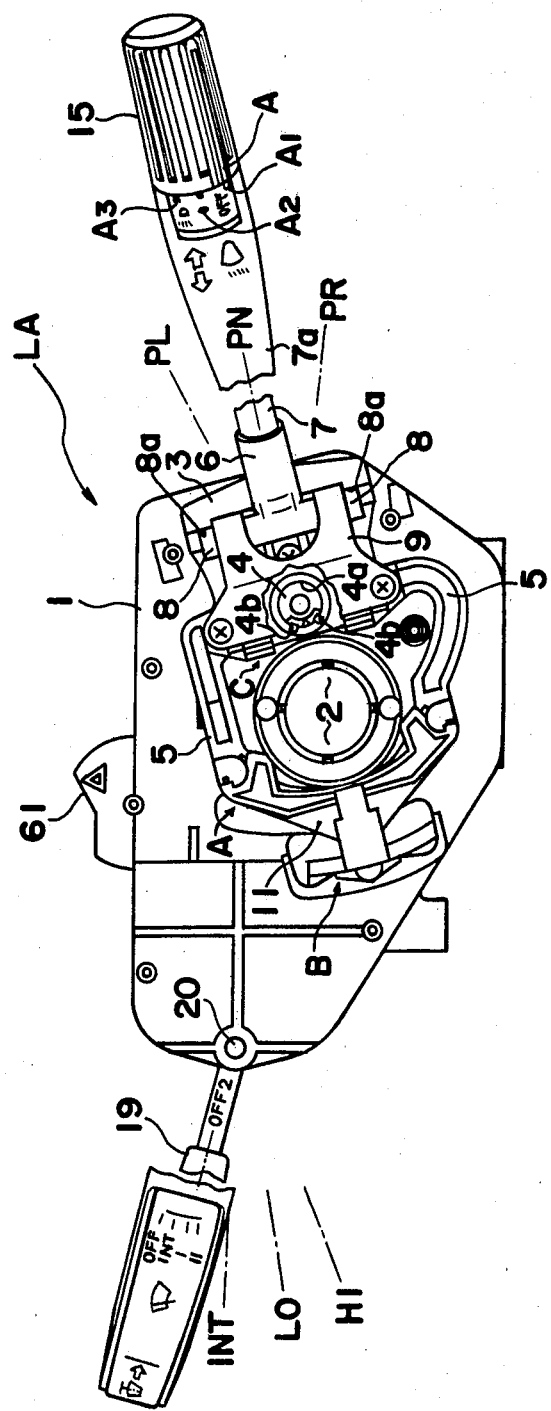
FIG. 1 is a top plan view of an electrical switching arrangement according to one preferred embodiment of the present invention.
Figure 2:
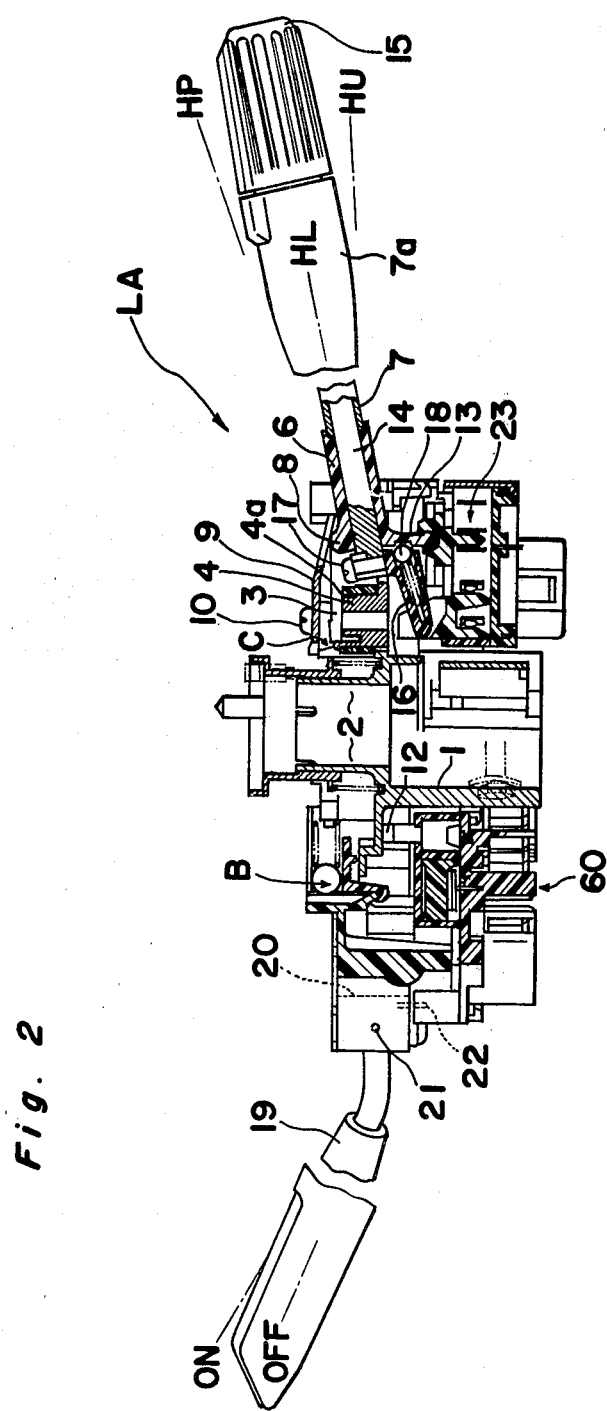
FIG. 2 is a side sectional view of the switching arrangement of FIG. 1.

Referring now to the drawings, there is shown in FIGS. 1 and 2 an electrical switching arrangement LA according to one preferred embodiment of the present invention. In FIGS. 1 and 2, the switching arrangement LA generally includes a support frame or column body 1 having a bore or opening 2 for receiving a steering shaft (not shown) therein and secured at a front part of a driver's seat (not shown) in a known manner, a lever holding or support member or bracket 3, for example, of plastic material rotatably coupled, at its through-opening 4a, around a hollow support stud 4 integrally formed with the support frame 1 in a position adjacent to opening 2 and having corresponding arms 5 laterally, outwardly extending therefrom so as to be associated with a known cancel cam mechanism A, and a lever connecting member 6 to which a hollow control lever 7 is connected to be one unit therewith and which has a pair of support shafts 8 laterally, outwardly extending therefrom, with the support shafts 8 being received in corresponding recesses 8a formed at the upper face of bracket 3, while the lever connecting member 6 is prevented from falling off the bracket 3 by a plate-like metal piece 9 fixed to the upper face of the lever support member 3 by fixing screws 10 (FIG. 2).

Figure 4:
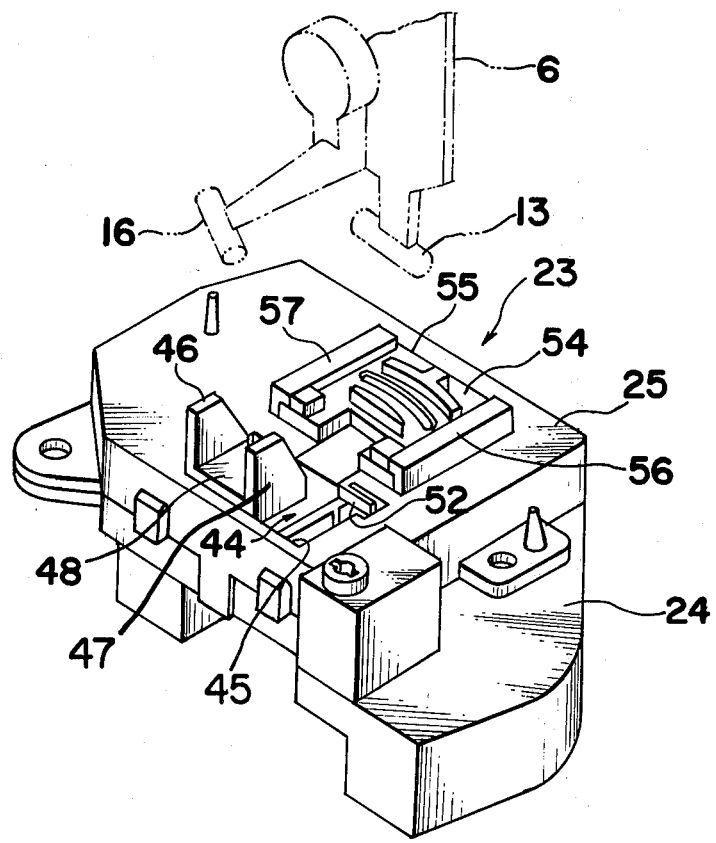
FIGS. 4 and 5 are perspective views of a first switch unit employed in the arrangement of FIG. 1.
Figure 5:
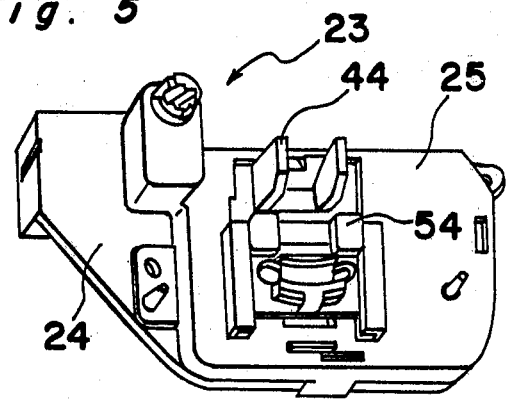

Accordingly, by the above arrangement, when the control lever 7 is rotated between a neutral position PN and a left turn indication position PL, and between the neutral position PN and a right turn indication position PR through operation thereof in a lateral direction, i.e. in the upward or downward direction in FIG. 1, the bracket 3 is also rotated about the support stud 4, and is retained at any of the neutral position PN, left turn indication position PL and right turn-indication position PR by a known detent mechanism B. Meanwhile, when the control lever 7 is rotated vertically, i.e. in the upward and downward direction in FIG. 2, the bracket 3 is independently rotated about the support shafts 8, while being retained at any of the neutral position PN, left turn indication position PL, and right turn indication position PR. The upward and downward rotation of the control lever 7 in FIG. 2 is equivalent to the passing and dimmer change-over operations, and the control lever 7 operated with respect to the head lamps is retained by a known detent mechanism C at any of a low beam position HL and a high beam position HU, and is also arranged to be repeatedly rotatable for operation between the low beam position HL and a passing indication position HP through a self-restoring action by suitable means (not shown). In the above case, upon rotation of the control lever 7 downward, i.e. in the clockwise direction in FIG. 2, the displacement of the left side portion of the bracket 3 tending to be raised from the support frame 1 about the support shafts 8 is prevented by the engagement of a pair of elastic claws 4b integrally formed with the support stud 4, with the corresponding peripheral edge portions of the through-opening 4a of the bracket 3. Meanwhile, the bracket 3 is provided, at its end portion 11 confronting the lever connecting member 6 through the opening 2, with a third actuating member 12 integrally formed therewith and projecting downwardly therefrom in FIG. 2, and at the lower surface of the lever connecting member 6, a first actuating member 13 (FIG. 4) is integrally formed therewith, with a control shaft 14 rotatably extended through the control lever 7. To one end of the control shaft 14 extending outwardly from a grip portion 7a of the control lever 7, a knob 15 for lighting control is fixed, while to the other end thereof extending outwardly from the lever connecting member 6, a second actuating member 16 (FIG. 4) is connected, for example, by a screw 17 so as to extend in parallel relation with the control shaft 14 as is seen from FIG. 2. The entire second actuating member 16 is arranged to be rotated as one unit with the control shaft 14 upon rotation of shaft 14 by the knob 15 for the lighting control so as to set an index mark A provided on the knob 15 selectively to an OFF position A1, a small lamp position A2 and a head lamp position A3, with the set position being maintained by a known detent mechanism 18 provided for the second actuating member 16 and first actuating member 13.

On the other hand, at the left side of the switching unit LA in FIGS. 1 and 2, there is provided an auxiliary lever 19 for controlling, for example, wiper and washer mechanisms (not shown), which lever 19 is connected to a shaft member 20 provided at the left side of the support frame 1 through a pin 21 so as to be also rotatable in the upward and downward directions in FIGS. 1 and 2. The shaft member 20 as described above is further provided with a depressing rod 22 which is to be depressed downwardly by the auxiliary lever 19 when lever 19 is rotated from an OFF₁ position to an ON position in FIG. 2 for washer control.

Figure 3:
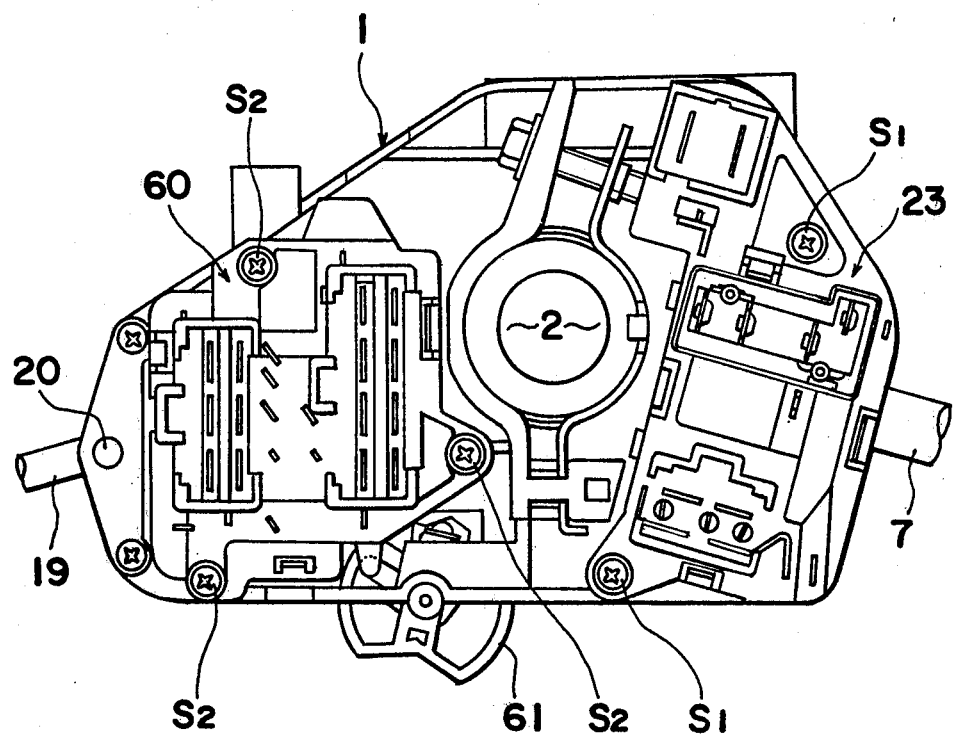
FIG. 3 is a bottom plan view of the switching arrangement of FIG. 1, with the control levers thereof broken away.
Figure 6:
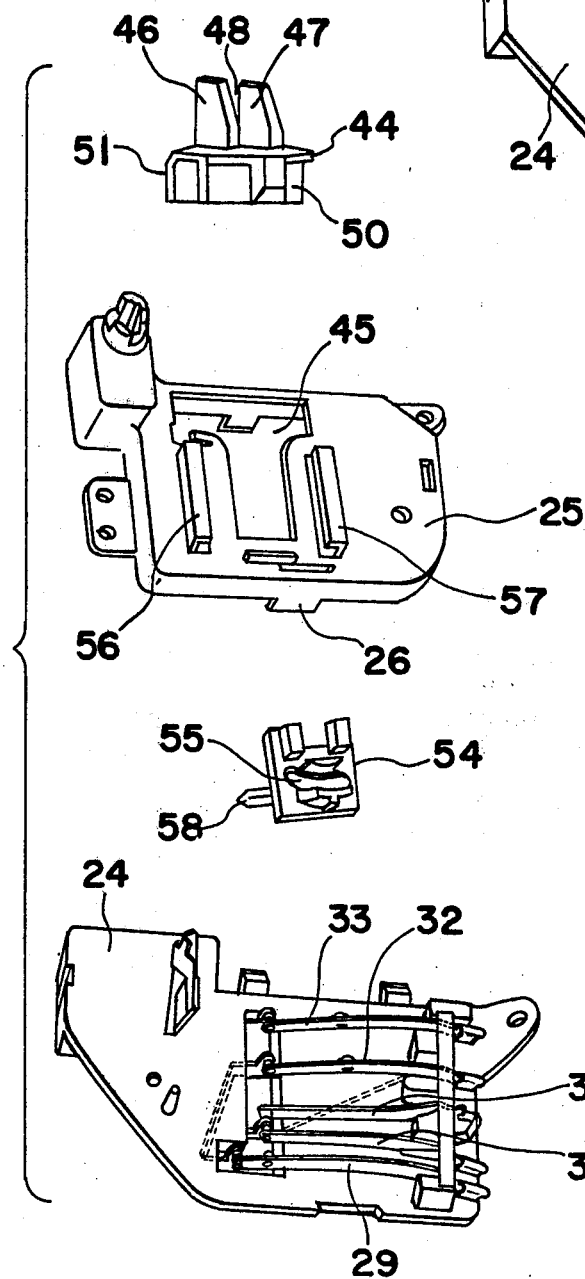
FIG. 6 is an exploded perspective view of the first switch unit of FIG. 5.
Figure 7:
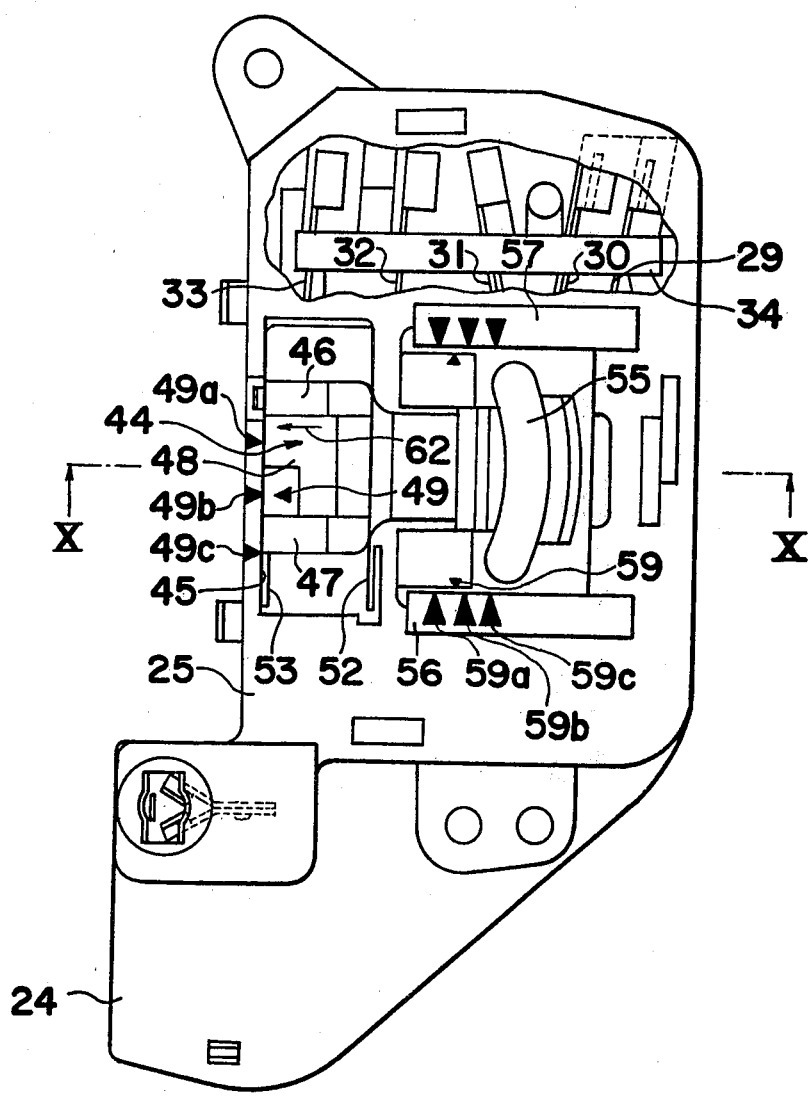
FIG. 7 is a top plan view, partly broken away and on an enlarged scale, of the first switch unit of FIGS. 4 and 5.
Figure 8:
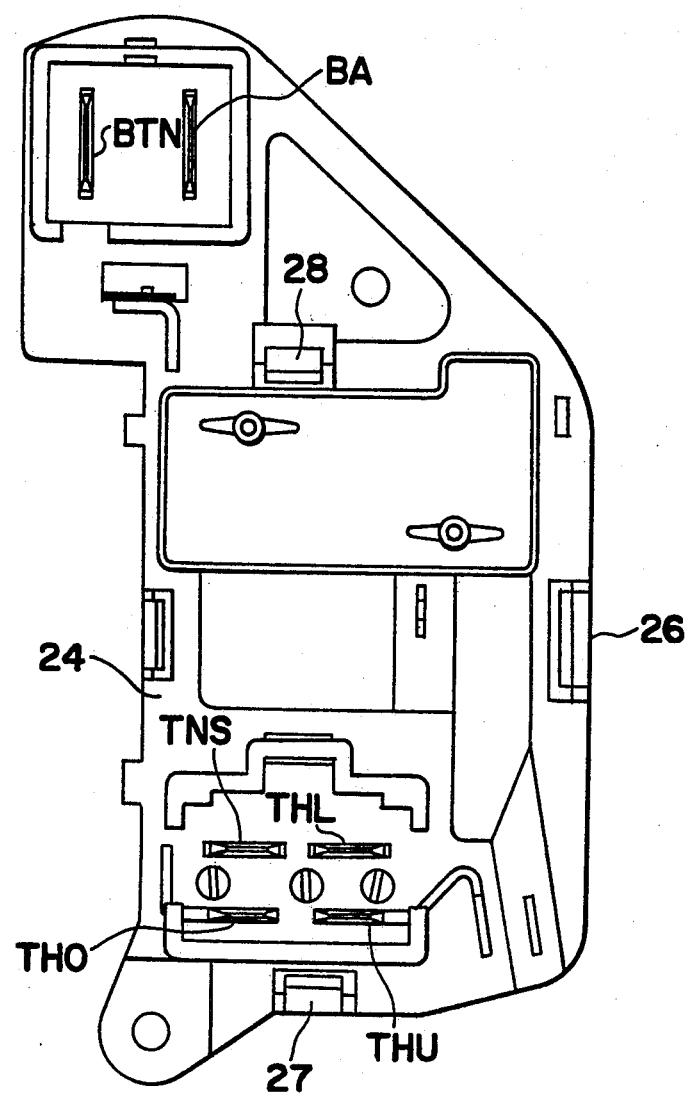
FIG. 8 is a bottom plan view of the switch unit of FIGS. 4 and 5.
Figure 9:
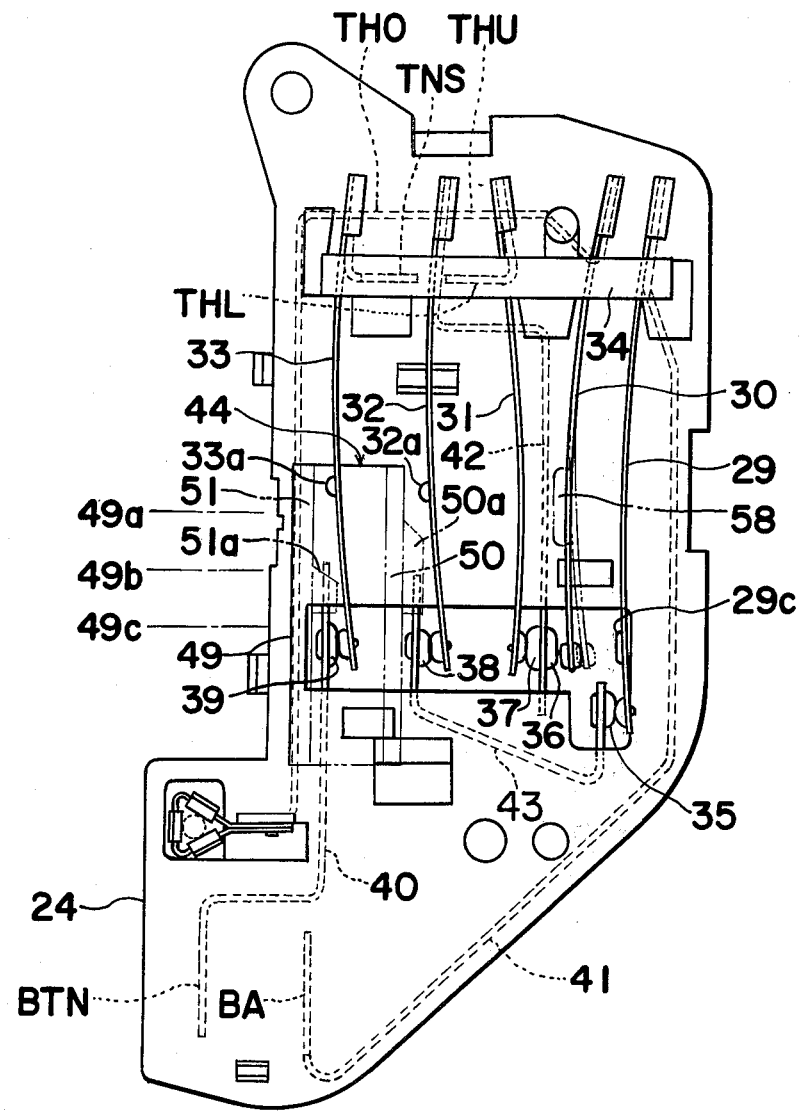
FIG. 9 is a top plan view of a switch base employed in the switch unit of FIGS. 4 and 5.

Referring particularly to FIGS. 4 to 11, a first switch unit 23 detachably mounted, for example, by fixing screws S1 (FIG. 3) to the under surface of the support frame 1 in a position corresponding to the control lever 7 for association therewith and having the passing and dimmer change-over and lighting control functions will be described hereinbelow. The first switch unit 23 generally includes a switch base 24 having switching elements incorporated therein in a manner described below, and a switch cover 25 which are combined with each other, for example, by engaging means 26, 27 and 28 to constitute switch unit 23. In FIG. 9 showing the construction of the switch base 24, with the switch cover 25 removed for clarity, five contact plates or contact springs 29, 30, 31, 32 and 33 supported by a block 34 integrally formed with the base 24 are arranged on the switch base 24 for selective contact and spacing from corresponding stationary or fixed contacts 35, 36, 37, 38 and 39 provided on the switch base 24. As shown in FIGS. 8 and 9, on the reverse surface of the switch base 24, there are provided terminals BA, BTN, TNS, THO, THU and THL for connections with connectors (not shown), in which the terminal BTN is connected to the fixed contact 39 through a conductor 40, the terminal BA to the contact spring 29 through a conductor 41, the terminal TNS to the contact spring 33, the terminal THL to the contact spring 31, and the terminal THU to the contact spring 30, while the contact spring 32 is connected to the fixed contacts 36 and 37 through a conductor 42, with the fixed contacts 35 and 38 being connected to each other by a conductor 43. The conductors 40 to 43 described above are embedded in the switch base 24. The terminals BTN and BA are respectively connected to power sources of different systems, while the terminal TNS is led to the so-called small lamps such as the side lamps, instrument illumination lamps, etc., the terminal THL, to the low beam head lamps, and the terminal THU, to the high beam head lamps. The switch unit 23 further includes a first sliding member 44 which is provided in an opening 45 formed in the switch cover 25 for upward and downward movements within opening 45, as viewed in FIGS. 7 and 9. On the upper surface of the first sliding member 44, there are provided a pair of spaced projections 46 and 47 defining a U-shaped groove 48 therebetween in which the end of the second actuating member 16 described earlier is movably or loosely fitted. Accordingly, when the knob 15 for lighting control is successively turned through the OFF position A1, small lamp position A2, and head lamp position A3 as shown in FIG. 1, the first sliding member 44 is moved downward as viewed in FIGS. 7 and 9, with mark 49, affixed on sliding member 44 being sequentially aligned with corresponding marks 49a, 49b and 49c provided on the switch cover 25. In FIG. 9, respective moving positions as described above are indicated by chain lines bearing the same numerals 49a, 49b and 49c as in FIG. 7. The first sliding member 44 which is moved in the manner as described above has for its object to effect the lighting control by laterally displacing the contact springs 32 and 33 in FIG. 9, and, for this purpose, is formed, at its reverse surface, with two sliding legs 50 and 51 respectively having, on the side faces thereof, cam projections 50a and 51a as shown in FIGS. 9 to 11. A resilient tongue 52 (FIG. 4) is integrally formed with one edge of the switch cover 25 in a position where the first sliding member 44 is aligned with the head lamp position within the opening 45 of switch cover 25. On the inner surface of the opening 45 in a position adjacent to the mark 49c, there is formed a guide projection 53 which normally engages a corresponding groove 53a (FIG. 10) formed in the first sliding member 44 for preventing unstable or unsteady movement of sliding member 44. FIG. 9 shows the state of the switch unit 23 in which the mark 49 of the sliding member 44 is registered with the mark 49c. When the knob 15 for lighting control is rotated to be set at the OFF position A1, the first sliding member 44 is caused to slide to the position where the mark 49 thereof is aligned with the mark 49a in FIG. 9, and in this position, the contact springs 32 and 33 are largely displaced toward the right as shown in FIG. 9 by the cam projections 50a and 51a through depression receiving portions 32a and 33a of the contact springs 32 and 33, and are spaced from the corresponding fixed contacts 38 and 39 as shown in FIG. 11(a). Accordingly, the conduction between the terminals BTN and TNS is electrically cut off, with the small lamps being de-energized. Meanwhile, the power supply from the terminal BA to the fixed contact 38 through the contact spring 29 and fixed contact 35, and then, finally to the fixed contacts 36 and 37, through terminal 43, fixed contact 38, contact spring 32 and terminal 42 is also cut off, and thus, the head lamps are also brought into the de-energized state except for the case in which the passing operation is effected. Subsequently, when the knob 15 for lighting control is set to the small lamp position A2, the first sliding member 44 is slid to the position where the mark 49 is aligned with the mark 49b, and at this position, the contact spring 32 is depressed by the cam projection 50a through a depression receiving portion 32a in a manner similar to that described above so as to be brought into a state where it is spaced from the fixed contact 38 as shown in FIG. 11(b), while the contact spring 33 contacts the fixed contact 39. Therefore, power is supplied to the terminal TNS from the terminal BTN to energize the small lamps. On the other hand, when the knob 15 is set to the head lamp position A3, the first sliding member 44 is slid to the position shown in FIG. 9 where the mark 49 thereof is registered with the mark 49c, and the contact springs 32 and 33 are both brought into contact with the corresponding fixed contacts 38 and 39 as shown in FIG. 11(c). Consequently, not only the small lamps are illuminated in the manner described above, but the power supplied up to the fixed contact 38 from the terminal BA as described earlier is then directed to the contact spring 32, conductor 42 and fixed contacts 36 and 37, and further, supplied therefrom either to the high beam head lamps or to low beam head lamps, depending on the passing and dimmer change-over operation.

The switch unit 23 further includes a second sliding member 54 for passing and dimmer change-over having an arcuate engaging groove 55 formed in its upper surface as shown in FIGS. 6, 7 and 10, and slidably engaged, at its opposite sides, with corresponding groove portions 56 and 57 provided on the upper surface of the switch cover 25 so as to confront each other, for sliding movement in the lateral direction as viewed in FIGS. 7 and 10. On the reverse surface of the second sliding member 54, there is provided a depressing projection 58 for displacing the contact springs 29, 30 and 31 in the lateral direction as viewed in FIG. 9, while the end of the first actuating member 13 integral with the lever connecting member 6 is engaged with the arcuate groove 55 of the sliding member 54 as shown in FIG. 2. Accordingly, when the control lever 7 is rotated upwardly or downwardly as viewed in FIG. 2 for dimmer and passing change-over, the second sliding member 54 is slid in the corresponding lateral direction as viewed in FIGS. 2, 7, 9 and 10, with the end of the first actuating member 13 being subjected to sliding movement along the arcuate groove 55. For facilitation of positioning, confirmation of operating positions, etc. during assembly, the second sliding member 54 is affixed with a mark 59, while the switch cover 25 is also marked with marks 59a, 59b and 59c respectively corresponding to the operating positions of the control lever 7, i.e. the high beam position HU, low beam position HL and passing indication position HP. When the control lever 7 is at the low beam position HL, the second sliding member 54 is located in the position where its mark 59 is registered with the mark 59b, and in this position, the depressing projection 58 of the sliding member 54 is located at a position such that the contact spring 30 is depressed toward the right as shown by the chain line in FIG. 9 so as to be spaced from the fixed contact 36. Therefore, under the conditions that the knob 15 for lighting control is set at the head lamp position A3, with the contact springs 32 and 33 being in the state as shown in FIG. 9, the power supplied from the terminal BA up to the fixed contact 38 is further led to the terminal THL through the contact spring 32, conductor 42, fixed contact 37 and contact spring 31, and thus, the low beam head lamps are illuminated. Meanwhile, when the control lever 7 is set at the high beam position HU, the second sliding member 54 takes the position where the mark 59 thereof is aligned with the corresponding mark 59a, with the depressing projection 58 of the sliding member 54 being shifted from the position shown in FIG. 9 toward the left, whereby the contact spring 30 is brought into contact with the fixed contact 36, while the contact spring 31 is spaced from the fixed contact 37. Consequently, the power supplied from the terminal BA to the conductor 42, with the knob 15 set at the head lamp position A3, is directed to the terminal THU through the fixed contact 36 and contact spring 30 so as to illuminate the high beam head lamps. On the contrary, upon repeated operation of the control lever 7 to the passing indication position HP, the second sliding member 54 is also repeatedly moved so that the mark 59 thereof is correspondingly aligned with the mark 59c, and therefore, the depressing projection 58 of the sliding member 54 is also repeatedly moved toward the right from the position shown in FIG. 9 so as to cause the high beam head lamps to flicker. More specifically, during the movement of the depressing projection 58 of the sliding member 54 toward the right from the position shown in FIG. 9, the contact spring 30 is displaced toward the right from the position shown by the chain lines in FIG. 9 to be brought into contact with the contact 29c of the contact spring 29, and thus, the power is supplied to the terminal THU through the terminal BA, conductor 41, and contact springs 29 and 30 for illuminating the high beam head lamps. Subsequently, the contact spring 30 displaces the contact spring 29 further to the right through the depressing projection 58 so as to be spaced from the fixed contact 35, and thus, the power supply to the terminal THL, i.e. to the low beam head lamps in the state where the knob 15 is set at the head lamp position A3, is cut off.

As shown in FIGS. 1 and 2, the switching arrangement LA further has a second switch unit 60 detachably mounted, for example, by fixing screws S2 (FIG. 3), to the under surface of the support frame 1 in a position corresponding to the auxiliary lever 19 for association therewith and including a so-called direction indication switch (not particularly shown) which is actuated through the third actuating member 12 by the displacement due to the upward and downward rotation (FIG. 1) of the control lever 7, a wiper switch (not particularly shown) which is actuated through upward and downward rotation (FIG. 1) of the auxiliary lever 19, a so-called washer switch (not particularly shown) which is actuated by the depressing rod 22 when the auxiliary lever 19 is set to an ON position shown from an OFF position in FIG. 2, and a hazard switch (not particularly shown) which is actuated by a knob 61 for hazard indication.

In FIG. 1, when the auxiliary lever 19 is set at a position INT, wipers (not shown) are driven intermittently at predetermined time intervals for wiping, and upon setting of the lever 19 at a position LO, the wipers are operated at a low speed, while upon setting of lever 19 at a position HI, the wipers are driven at high speed for wiping. Since the known circuit arrangement of the second switch unit 60 is not directly related to the present invention and is described, for example, in detail in Japanese Utility Model Application Jikkaisho No. 54-42525, a detailed description thereof is omitted herein for the sake of brevity.

It is to be noted here that the switching arrangement LA according to the present invention described in the foregoing is particularly characterized in that the resilient tongue piece 52 is provided in the mechanism in which the sliding member 44 is employed for selective opening and closing of the contact springs 32 and 33 between the fixed contacts 38 and 39. More specifically, as shown in FIGS. 11(a) and 11(b), when the sliding member 44 is located at the position corresponding to the OFF position A1 or small lamp position A2, it is subjected to a spring force by either of the contact springs 32 or 33 in the direction indicated by the arrow 62 in FIG. 7 with respect to one side face of the opening 45, through the depression receiving portions 32a and 33a, and thus, sliding member 44 is held stably with the opening 45 irrespective of vibrations of the respective motor vehicle. On the contrary, however, at the head lamp position A3, since the sliding member 44 is not subjected to any spring force from either of the contact springs 32 or 33 as shown in FIG. 11(c), it becomes undesirably unstable in the vertical or lateral direction as viewed in FIG. 11(c). However, in the arrangement according to the present invention, since the sliding member 44 is depressed toward the one side face of the opening 45 in the direction indicated by the arrow 62 by the resilient tongue piece 52 at the position A3, sliding member 44 is positively prevented from being unstable due to vibrations of the motor vehicle. Accordingly, the movable or loose fitting between the groove or recess 48 of the first sliding member 44 and the end of the actuating member 16 is advantageously achieved to alleviate dimensional in accuracy therebetween for the improvement of efficiency in the assembly during manufacture, without inviting instability of the sliding member.

Referring to FIGS. 12 through 19, there is shown in FIGS. 12 and 13 a modification of the switching arrangement LA of the foregoing embodiment. The modified switching arrangement LB of FIGS. 12 and 13 generally has the same construction as in the switching arrangement LA of the first embodiment except that the first switch unit 23 of the arrangement LA is replaced by a first switch unit 123, and therefore, the description below mainly is directed to the switching unit 123, with like parts being designated by like reference numerals.

Referring particularly to FIGS. 14 to 20, the switch unit 123 generally includes a switch base 124 having a flat base portion 124A on its surface and switching elements incorporated therein in the manner described below, and a switch cover 125 coupled to the switch base 124 by suitable engaging means similar to those in the first embodiment. In a space 120 provided in the lower portion of the switch base 124, there are provided a plurality of, for example, three contact plates 119a, 119b and 119c each supported in a cantilever fashion by a support block 121 integrally formed with the switch base 124 so as to be respectively, electrically conducted to the terminals TNS, THL and THU. Meanwhile, in positions corresponding to free ends of contact plates 119a, 119b and 119c, two fixed contact terminals BA and BTN are provided. The contact terminal BA is arranged to selectively contact or be spaced from the contact plates 119b and 119c so as to serve as two switch elements, while the contact terminal BTN is adapted to selectively contact or be spaced from the contact plate 119a and functions as one switch element. Moreover, in the switch base portion 124A in positions confronting the contact plates 119a, 119b and 119c, rods or pins 122a, 122b and 122c (FIGS. 15 and 17) are provided in a line so as to be vertically movable as viewed in FIG. 15 to act as cam pieces. The contact plates 119a, 119b and 119c normally contact the contact terminals BTN and BA by their spring force, and are arranged to be spaced therefrom when depressed by the rods 122a, 122b and 122c. On the switch cover 125, there is provided a second sliding member 154 which is arranged to be movable in the lateral direction as viewed in FIG. 15 (i.e. in a direction indicated by the arrows X in FIG. 14) along guide grooves g respectively formed in opposed guide walls 124a and 124b provided on the upper portion of switch cover 125, and which has formed in its upper surface an arcuate engaging groove or recess 126 (similar to the groove 55 in the first embodiment) for engagement with the first actuating member 13 as described with reference to the first embodiment. Moreover, there is further provided a first sliding member 144 which is slidably received, at its opposite edges, in corresponding guide grooves 128a and 128b provided at the under side of second sliding member 154 for movement in the direction of the arrow Y in FIG. 14, i.e. in a direction intersecting the direction of movement of the second sliding member 154 (in a direction at right angles thereto in this embodiment). Extending upwardly from the upper surface of the first sliding member 144 are a pair of spaced projections 130a and 130b, in positions adjacent to one side edge of the second sliding member 154 so as to provide a U-shaped groove or engaging recess 130 between projections 130a and 130b for receiving the second actuating member 16 in recess 130. In the reverse surface of the first sliding member 144, cam recesses 131, 132, 133 and 134, for example, of rectangular configurations are formed so as to function as cam portions in a manner described below. In connection with the above, the rods 122a, 122b and 122c mentioned earlier function in such a manner that they selectively depress the contact plates 119a, 119b and 119c downwardly as viewed in FIG. 15 for turning off the switch elements when the rods are in contact with the under surface of the first sliding member 144 at portions thereof except for the cam recesses 131 to 134, and they release contact plates 119a, 119b and 119c from depression when the rods are located in the cam recesses for turning on the switch elements.

Figure 14:
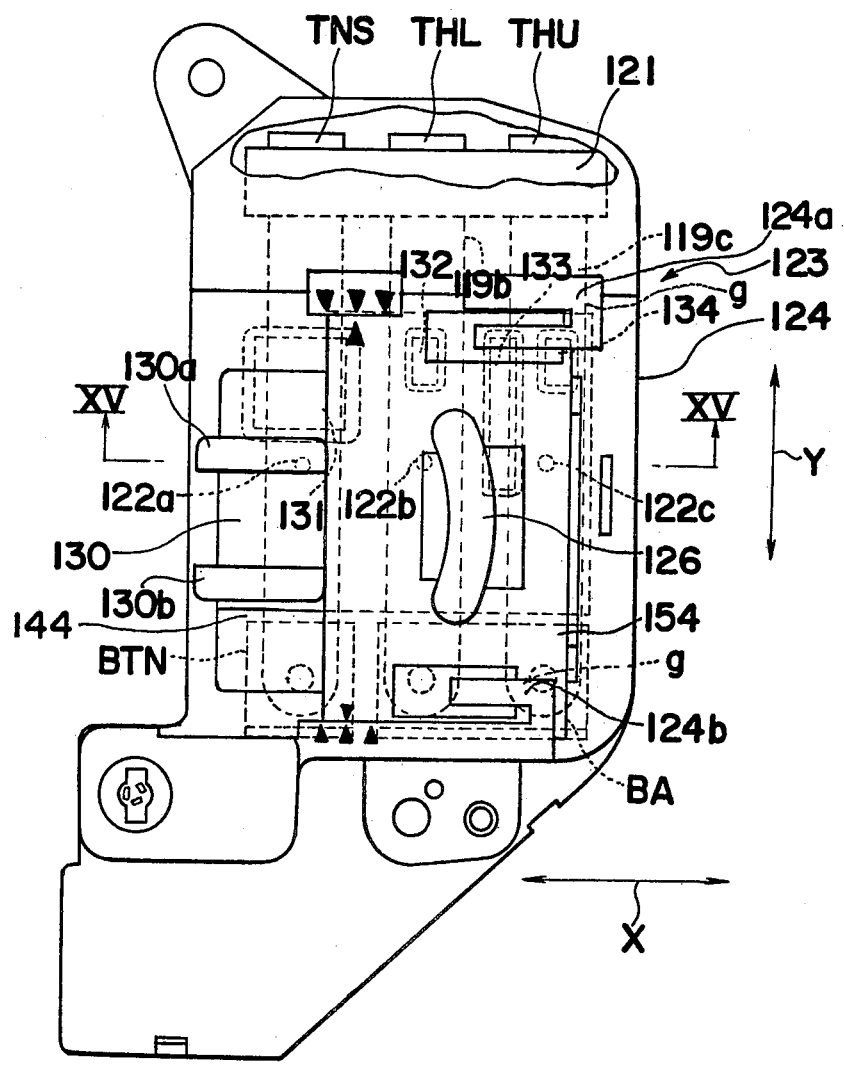
FIG. 14 is a view similar to FIG. 7, which particularly shows a modification thereof.
Figure 15:
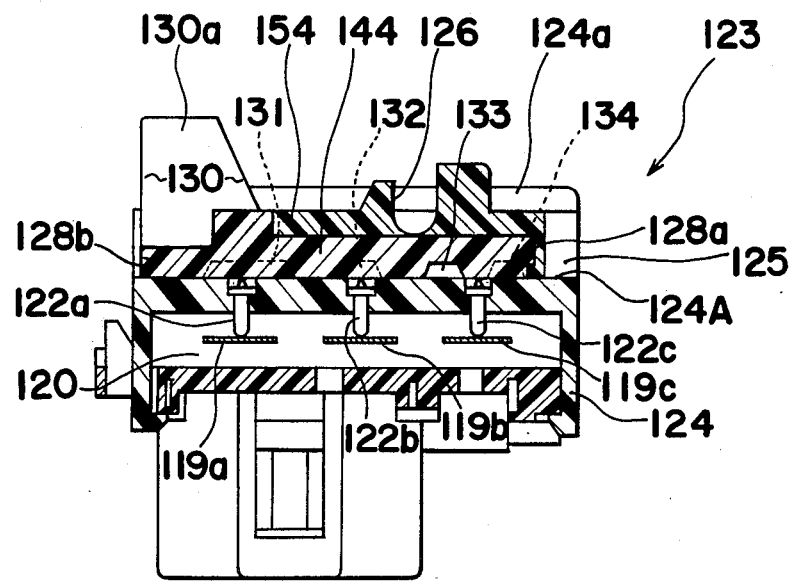
FIG. 15 is a cross section taken along the line XV—XV in FIG. 14.
Figure 16:
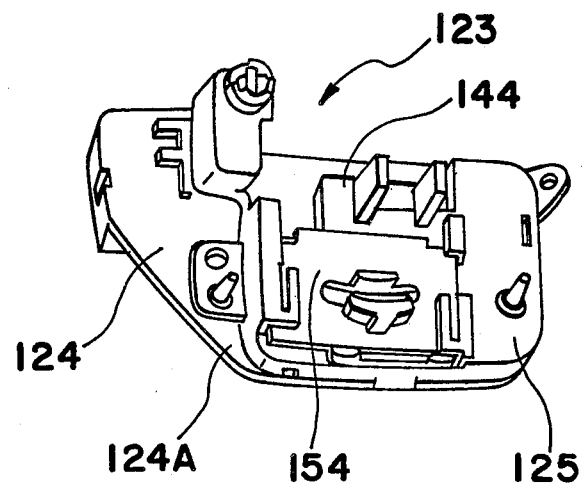
FIG. 16 is a perspective view of a modified switch unit employed in the arrangement of FIGS. 12 and 13.
Figure 18:
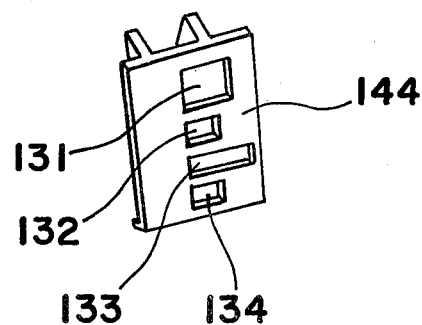
FIG. 18 is a perpsective view showing a reverse surface of a first sliding member employed in the switch unit of FIGS. 16 and 17.
Figure 17:
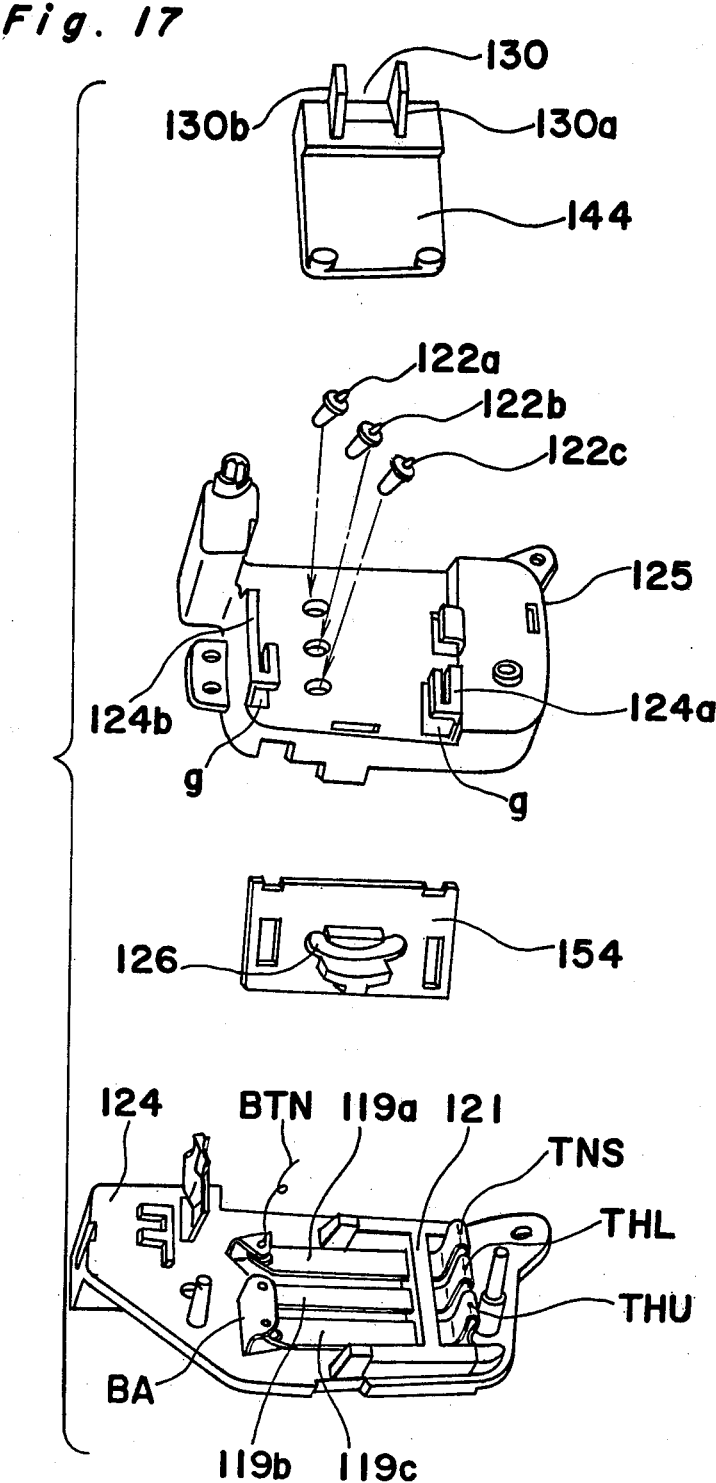
FIG. 17 is an exploded perspective view of the modified switch unit of FIG. 16.

By the above arrangement, when the control lever 7 is rotated upwardly and downwardly about the support shafts 8 as viewed in FIG. 13, the second sliding member 154 which is engaged with the first actuating member 13 is caused to reciprocate in the directions of the arrows X in FIG. 14. Meanwhile, upon rotation of the lighting control knob 15 of the control lever 7 for operation, the end of the second actuating member 16 performs an arcuate movement about the control shaft 14, and thus, the first sliding member 144 engaged with the actuating member 16 is caused to reciprocate in the directions of the arrows Y in FIG. 14.

The closing and opening functions of the switch elements through combinations of the sliding members 154 and 144 as stated above will be described hereinbelow with reference to FIGS. 19 and 20. It is to be noted that, although the symbols given in FIG. 19 have the same meanings as those shown in FIGS. 12 to 15, the operating positions will be referred to by the term "line" in such a manner, for example, as A2 line for the small lamp position A2. It should also be noted that the positions shown by black points in FIG. 19 represent positions taken by the rods 122a, 122b and 122c following the combined movements of the sliding members 144 and 154 and corresponding to the cam recesses 131, 132, 133 and 134, while symbols O—O in FIG. 20 indicate that the terminals marked with the symbols O are brought into an electrically conducting state.

Figures 19, 20:
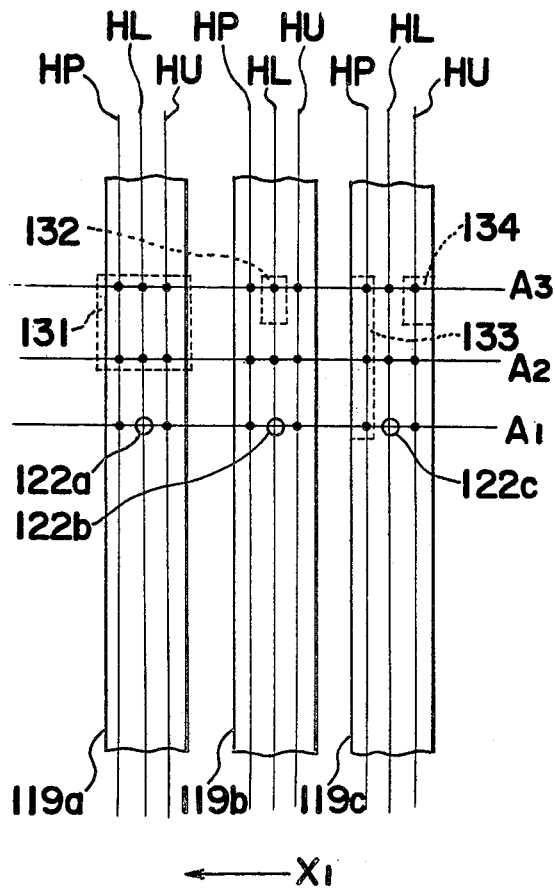
FIG. 19 is a fragmentary view of contact plates employed in the switch unit of FIGS. 16 and 17 explanatory of functions thereof.
FIG. 20 is a diagram explanatory of circuit connections of the switch unit of FIGS. 16 and 17.

On the assumption that the lighting control knob 15 is set to the OFF position A1, with the control lever 7 being set at the low beam position HL, the respective rods 122a, 122b and 122c are in the relative positions as shown in FIG. 19 with respect to the cam recesses 131, 132, 133 and 134. In the above state, when the control lever 7 is rotated from the low beam position HL to the passing indication position HP, the respective rods 122a to 122c are relatively moved on the A1 line in the direction of the arrow X1 up to the intersections with respect to the respective HP lines, and only the rod 122c goes into the cam recess 133, and thus, the contact plate 119c is brought into contact with the terminal BA to provide the circuit connection shown at "A1-HP" in FIG. 20 for the passing indication. Subsequently, with the control lever 7 set at the low beam position HL, when the lighting control knob 15 is turned from the OFF position A1 to the small lamp position A2, the respective rods 122a to 122c are relatively moved on the corresponding HL lines from the line A1 to the intersections with the A2 lines, and consequently, the rod 122a goes into the cam recess 131 so as to establish the circuit connection shown at "A2-HL" in FIG. 20 in a manner similar to that described earlier, and thus, the small lamps are illuminated. In the above state, upon operation of the control lever 7 to the passing indication position HP, the respective rods 122a to 122c are shifted to the intersections along the A2 line to respective HP lines so as to establish the circuit connection shown at "A2-HP" in FIG. 20, and thus, the passing indication is given, with the small lamps illuminated. Meanwhile, when the lighting control knob 15 is set at the head lamp position A3, the respective rods 122a to 122c are relatively moved on the HL lines up to the intersections with the A3 line, with the rods 122a and 122b being located in the cam recesses 131 and 132, and thus, the circuit connection as shown at "A3-HL" in FIG. 20 is established for illuminating the low beam head lamps. In the state where the lighting control knob 15 is set at the head lamp position A3 again as described above, and when the control lever 7 is set at the high beam position HU, the respective rods 122a to 122c are relatively shifted to the intersections between the A3 line and corresponding HU lines, and the rods 122a and 122c enter the cam recesses 131 and 134 to establish the circuit connection as shown at "A3-HU" of FIG. 20 so as to illuminate the high beam head lamps. In the above state, when the control lever 7 is operated to the passing indication position HP, the respective rods 122a to 122c are relatively shifted up to the intersections between the A3 line and respective HP lines. Consequently, the rods 122a and 122c go into the cam recesses 131 and 133 to establish the circuit connection as shown at "A3-HP" in FIG. 20 and thus, the passing indication is effected.

It should be noted here that the present invention is not limited in its application to the foregoing embodiments alone, but may further be modified in various ways. For example, the cam actuators described as in the form of separate rods in the foregoing embodiment may be replaced by similar cam actuators integrally formed with the contact plates, while the closing of the switch elements described as effected by the recessed portions of the cams may be modified to be effected by projecting portions of the cams. Furthermore, the switching arrangements according to the present invention are not limited in their application to switching arrangements for motor vehicles alone, but may readily be applicable to various switching arrangements in general for other purposes.

As is clear from the foregoing description, the modified switch unit of FIGS. 14 to 20 includes the switch base having the plurality of switch elements and cam actuators for selectively opening and closing the switch elements, the second sliding member reciprocatingly provided on the switch base, the first sliding member provided in the second sliding member so as to reciprocate in a direction intersecting the moving direction of the second sliding member, cam portions provided in the first sliding member so as to selectively displace the cam actuators through the movement of the first sliding member for selective opening and closing of the switch elements, and the first and second actuating members for individually operating the first and second sliding members. This arrangement has such effects that, since the plurality of loads are electrically controlled in association with each other through combinations of operations by the two actuating members respectively having purposes inherent therein, by selectively displacing the group of cam actuators with the sliding members reciprocating on lines intersecting each other for opening and closing the switch elements corresponding to the cam actuators, the switch elements may be commonly utilized for compact size of the switching arrangement, and thus, the number of wires can be reduced, with consequent reduction of space required for the installation of the switching arrangement.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as included therein.

What is claimed is:

1. An electrical switching arrangement for use in a motor vehicle or the like, said arrangement comprising:
a support frame;
a lever support member pivotally mounted on said support frame for pivotal movement about a first support axis;
a hollow control lever member pivotally mounted with respect to said lever support member for pivotal movement about a second support axis extending in a direction different from that of said first support axis;
a control shaft extending coaxially through the hollow interior of said control lever member and rotatable with respect thereto about the longitudinal axis thereof;
a first actuating member connected to said control lever member;
a second actuating member connected to said control shaft;
switching means mounted on said support frame and including:
a switch base;
a plurality of switch elements disposed on said switch base;
a second sliding member mounted for sliding movement in a predetermined first direction;
a first sliding member carried by said second sliding member for movement therewith in said first direction, said first sliding member being mounted for sliding movement with respect to said second sliding member in a second direction extending approximately at a right angle to said first direction;
a plurality of cam actuators mounted for movement with respect to said switch base for selective opening and closing of said switch elements; and
cam means on said first sliding member for selectively displacing said cam actuators with respect to said switch base; and
connecting means for connecting said second sliding member to one of said first and second actuating members and for connecting said first sliding member to the other of said first and second actuating members, such that upon selective pivoting movement of said control lever member about said second support axis and rotational movement of said control shaft about said longitudinal axis, said first sliding member is moved in said second direction independently of said second sliding member, or said first sliding member is moved in said first direction with said second sliding member, thereby to displace selectively said cam actuators for opening and closing selected of said switch elements.

2. An electrical switching arrangement as claimed in claim 1, wherein said first sliding member is connected to said second actuating member, and said second sliding member is connected to said first actuating member, with the connection between said second actuating member and said first sliding member being disposed in a position to be generally aligned in the axial direction with said first support axis.

3. An electrical switching arrangement as claimed in claim 2, wherein said second sliding member has a generally arcuate recess, and said first actuating member has a portion engaging said arcuate recess, thereby to connect said second sliding member and said first actuating member to each other, and said first sliding member has a generally U-shaped groove, and said second actuating member has a portion engaging said U-shaped groove, thereby to connect said first sliding member and said second actuating member to each other.

4. An electrical switching arrangement as claimed in claim 1, wherein said switching means is operable to effect dimmer and passing change-over indications upon rotation of said control lever member about said second support axis, and to effect lighting control upon rotation of said control shaft about said longitudinal axis.

5. An electrical switching arrangement as claimed in claim 1, wherein said cam actuators are integrally formed with contact plates of said switch elements.

6. An electrical switching arrangement as claimed in claim 1, wherein said cam actuators comprise rods mounted for movement through said switch base.

7. An electrical switching arrangement as claimed in claim 1, wherein said cam means comprise plural cam recesses formed in said first sliding member.

8. An electrical switching arrangement as claimed in claim 1, wherein said cam means comprise plural cam projections formed on said first sliding member.

* * * * *